(12) United States Patent
Huang et al.

(10) Patent No.: US 10,803,445 B2
(45) Date of Patent: Oct. 13, 2020

(54) SYSTEM AND METHOD OF CONDUCTING AN AUTHENTICATION TRANSACTION

(71) Applicant: MASTERCARD ASIA PACIFIC PTE. LTD., Singapore (SG)

(72) Inventors: Donghao Huang, Singapore (SG); Bensam Joyson, Singapore (SG); Jie Zhang, Singapore (SG); Jasmine Ng, Singapore (SG); Ross Finch, Singapore (SG)

(73) Assignee: MASTERCARD ASIA/PACIFIC PTE. LTD., Singapore (SG)

( * ) Notice: Subject to any disclaimer, the term of this patent is extended or adjusted under 35 U.S.C. 154(b) by 564 days.

(21) Appl. No.: 14/301,683

(22) Filed: Jun. 11, 2014

(65) Prior Publication Data

US 2014/0365370 A1 Dec. 11, 2014

(30) Foreign Application Priority Data

Jun. 11, 2013 (SG) .................. 201304512

(51) Int. Cl.
*G06Q 20/32* (2012.01)
*G06Q 20/40* (2012.01)
*G06Q 20/38* (2012.01)

(52) U.S. Cl.
CPC ....... *G06Q 20/3278* (2013.01); *G06Q 20/322* (2013.01); *G06Q 20/38215* (2013.01); *G06Q 20/40* (2013.01)

(58) Field of Classification Search
None
See application file for complete search history.

(56) References Cited

U.S. PATENT DOCUMENTS

| | | | |
|---|---|---|---|
| 2010/0170947 A1* | 7/2010 | Christofferson | G06Q 10/02 235/382 |
| 2011/0022405 A1* | 1/2011 | Heinz | G06Q 10/02 705/1.1 |
| 2012/0029990 A1* | 2/2012 | Fisher | G06Q 20/105 705/14.19 |
| 2012/0064828 A1* | 3/2012 | Khan | H04L 63/0492 455/41.1 |

OTHER PUBLICATIONS

Texas Instruments, Near Field Communication, 2016, Texas Instruments Incorporated.*

* cited by examiner

*Primary Examiner* — Zehra Raza
(74) *Attorney, Agent, or Firm* — Buchanan Ingersoll & Rooney PC

(57) ABSTRACT

A system and method of conducting an authentication transaction; and a near field communication (NFC) enabled mobile device for conducting the authentication transaction. The method includes the steps of: storing data associated with one or more authentication certificates in a secure element of the NFC enabled mobile device; sending the data associated with the one or more authentication certificates from the NFC enabled mobile device to a server via a NFC enabled transceiver; verifying the authenticity of the one or more authentication certificates at the server; and upon successful authentication, sending transaction data from the server to the NFC enabled mobile device via the NFC enabled transceiver.

11 Claims, 4 Drawing Sheets

Figure 4:
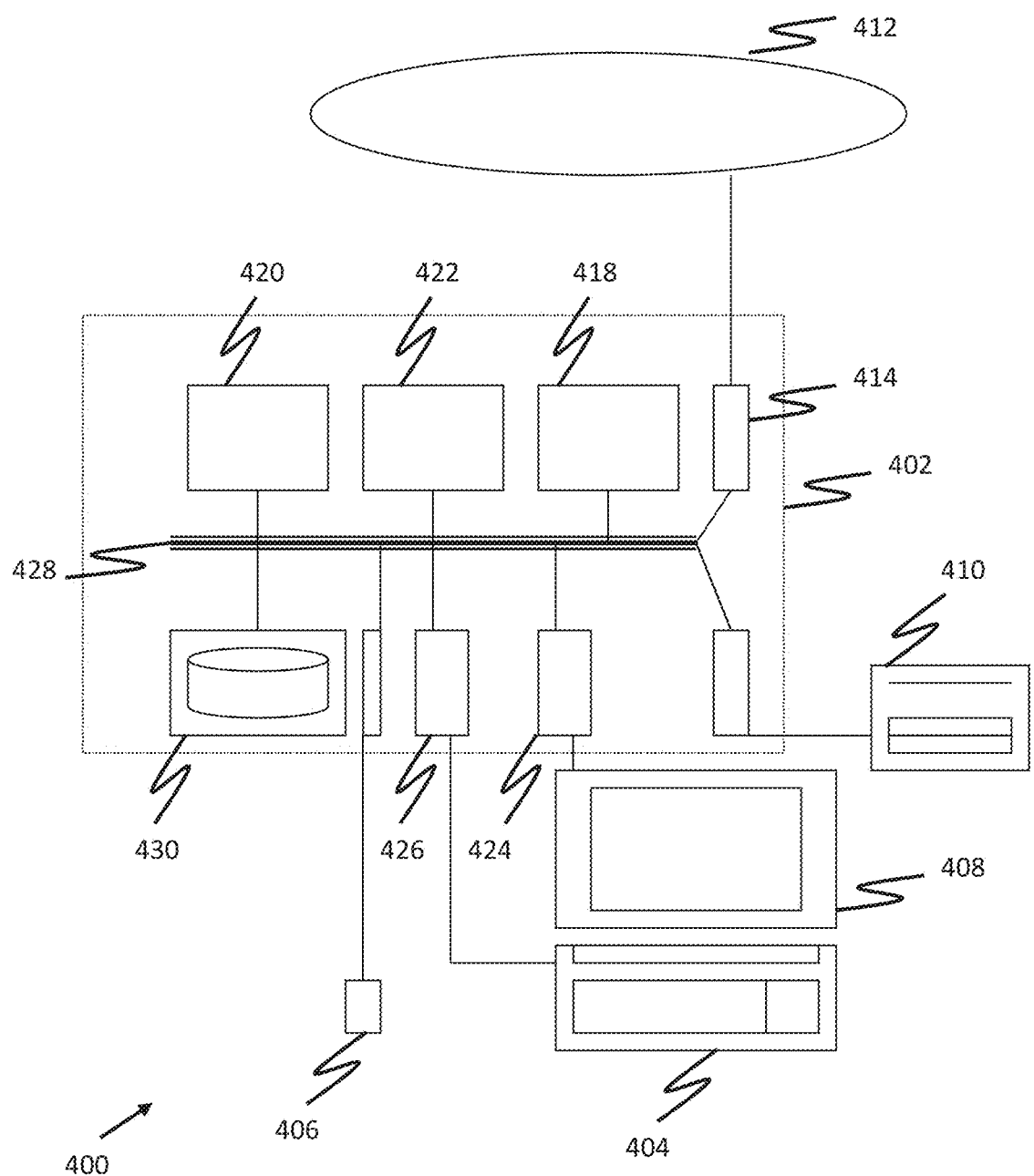

SYSTEM AND METHOD OF CONDUCTING AN AUTHENTICATION TRANSACTION

FIELD OF INVENTION

The invention relates to a system and a method of conducting an authentication transaction.

BACKGROUND

Currently, mobile communication devices such as smartphones may have near field communication (NFC) capabilities. NFC is a set of standards for smartphones and similar devices to establish radio communication with each other by bringing them into close proximity such as only a few centimeters. NFC standards cover communications protocols and data exchange formats, and are based on existing radio-frequency identification (RFID) technology. Communication is also possible between a NFC device and an unpowered NFC device, called a “tag”.

NFC devices can be used in contactless payment systems, similar to those currently used in credit cards and smartcards. For example, consumers can store credit card information in a virtual wallet and then use an NFC-enabled device at terminals that accept such contactless payment transactions. Contactless payment systems provide consumers with simple, fast and convenient ways to pay for goods and services in retail establishments.

Currently, when consumers travel, they usually have to print out their flight tickets, hotel vouchers, booking receipts, travel itineraries, etc. It can be difficult to print out all these documents and safe-keep them, and there is a risk of misplacing one or more of these documents.

SUMMARY

According to a first aspect of the present invention, there is provided a method of conducting an authentication transaction using a near field communication (NFC) enabled mobile device, the method including: storing data associated with one or more authentication certificates in a secure element of the NFC enabled mobile device; sending the data associated with the one or more authentication certificates from the NFC enabled mobile device to a server via a NFC enabled transceiver; verifying the authenticity of the one or more authentication certificates at the server; and upon successful authentication, sending transaction data from the server to the NFC enabled mobile device via the NFC enabled transceiver.

The method may further comprise importing the one or more authentication certificates from one or more external sources into the NFC enabled mobile device.

The authenticity of the one or more authentication certificates may be verified based on the data associated with the one or more authentication certificates.

The method may further comprise storing the one or more authentication certificates in a non-secure element of the NFC enabled mobile device.

The method may further comprise generating the transaction data at the server.

The method may further comprise storing the transaction data in the secure element of the NFC enabled mobile device.

The method may further comprise indicating on the NFC enabled mobile device once transaction data has been received.

The method may further comprise extracting the data associated with the one or more authentication certificates from the one or more authentication certificates; and transferring the extracted data associated with the one or more authentication certificates from the non-secure element to the secure element of the NFC enabled mobile device.

The method may further comprise updating a database on the server upon successful authentication.

The authentication certificates may be of different types and may comprise one or more of: flight tickets, hotel vouchers, car rental vouchers, amusement park booking tickets.

The server to which the data is sent is associated with the one or more authentication certificates with which the data is associated with.

The transaction data may comprise boarding passes and/or coupons.

According to a second aspect of the present invention, there is provided system for conducting an authentication transaction, including: at least one near field communication (NFC) enabled mobile device configured to store data associated with one or more authentication certificates in a secure element of the at least one NFC enabled mobile device; at least one server configured to verify the authenticity of the one or more authentication certificates; and at least one NFC enabled transceiver configured to send the data associated with the one or more authentication certificates from the at least one NFC enabled mobile device to the at least one server, and send transaction data from the at least one server to the at least one NFC enabled mobile device upon successful authentication.

The authenticity of the one or more authentication certificates may be verified based on the data associated with the one or more authentication certificates.

The at least one server may be further configured to generate the transaction data.

According to a third aspect of the present invention, there is provided near field communication (NFC) enabled mobile device for conducting an authentication transaction, including: at least one processor; and at least one memory module having computer program code stored thereon, the computer program code configured to, with the at least one processor, cause the NFC enabled mobile device to: store data associated with one or more authentication certificates in a secure element of the NFC enabled mobile device; send, via NFC, the data associated with the one or more authentication certificates to a server; query the server, to verify the authenticity of the one or more authentication certificates; and receive, upon successful authentication, transaction data from the server.

BRIEF DESCRIPTION OF THE DRAWINGS

Example embodiments of the invention will be better understood and readily apparent to one of ordinary skill in the art from the following written description, by way of example only, and in conjunction with the drawings, in which:

FIG. 1 is an architecture diagram of a system for conducting an authentication transaction, according to an embodiment of the present invention;

FIG. 2 is a sequence diagram of a method for conducting an authentication transaction according to an embodiment of the present invention;

FIG. 3 is a flow chart illustrating a method of conducting an authentication transaction using a near field communication (NFC) enabled mobile device, according to an example embodiment of the present invention; and FIG. 4 is a schematic of a computer system for implementing the system and method of conducting an authentication transaction in example embodiments of the present invention.

DETAILED DESCRIPTION

Embodiments of the present invention will be described with reference to the drawings. Like reference numerals and characters in the drawings refer to like elements or equivalents.

Some portions of the description which follows are explicitly or implicitly presented in terms of algorithms and functional or symbolic representations of operations on data within a computer memory. These algorithmic descriptions and functional or symbolic representations are the means used by those skilled in the data processing arts to convey most effectively the substance of their work to others skilled in the art. An algorithm is here, and generally, conceived to be a self-consistent sequence of steps leading to a desired result. The steps are those requiring physical manipulations of physical quantities, such as electrical, magnetic or optical signals capable of being stored, transferred, combined, compared, and otherwise manipulated.

Unless specifically stated otherwise, and as apparent from the following, it will be appreciated that throughout the present specification, discussions utilizing terms such as "scanning", "calculating", "determining", "replacing", "generating", "initializing", "outputting", or the like, refer to the action and processes of a computer system, or similar electronic device, that manipulates and transforms data represented as physical quantities within the computer system into other data similarly represented as physical quantities within the computer system or other information storage, transmission or display devices.

The present specification also discloses apparatus for performing the operations of the methods disclosed herein. Such apparatus may be specially constructed for the required purposes, or may comprise a general purpose computer or other device selectively activated or reconfigured by a computer program stored in the computer. The algorithms and displays presented herein are not inherently related to any particular computer or other apparatus. Various general purpose machines may be used with programs in accordance with the teachings herein. Alternatively, the construction of more specialized apparatus to perform the required method steps may be appropriate. The structure of a conventional general purpose computer will appear from the description below.

In addition, the present specification also implicitly discloses a computer program, in that it would be apparent to the person skilled in the art that the individual steps of the method described herein may be put into effect by computer code. The computer program is not intended to be limited to any particular programming language and implementation thereof. It will be appreciated that a variety of programming languages and coding thereof may be used to implement the teachings of the disclosure contained herein. Moreover, the computer program is not intended to be limited to any particular control flow. There are many other variants of the computer program, which can use different control flows without departing from the spirit or scope of the invention.

Furthermore, one or more of the steps of the computer program may be performed in parallel rather than sequentially. Such a computer program may be stored on any computer readable medium. The computer readable medium may include storage devices such as magnetic or optical disks, memory chips, or other storage devices suitable for interfacing with a general purpose computer. The computer readable medium may also include a hard-wired medium such as exemplified in the Internet system, or wireless medium such as exemplified in the GSM, GPRS, 3G or 4G mobile telephone systems. The computer program when loaded and executed on such a general-purpose computer effectively results in an apparatus that implements the steps of the preferred method.

The invention may also be implemented as hardware modules. More particular, in the hardware sense, a module is a functional hardware unit designed for use with other components or modules. For example, a module may be implemented using discrete electronic components, or it can form a portion of an entire electronic circuit such as an Application Specific Integrated Circuit (ASIC). Numerous other possibilities exist. Those skilled in the art will appreciate that the system can also be implemented as a combination of hardware and software modules.

According to an embodiment of the present invention, there is provided a method of conducting an authentication transaction using a near field communication (NFC) enabled mobile device, the method comprising the following steps:

1. Importing one or more authentication certificates from one or more external sources into the NFC enabled mobile device. The NFC enabled mobile device may be a smartphone, tablet computer or the like. The one or more authentication certificates may be of different types, such as a flight ticket, hotel voucher, car rental voucher, amusement park booking ticket or any other electronic document which requires authentication before access is provided. For example, a flight ticket has to be authenticated before a passenger can be allowed to check-in at the airport. The external sources may be third party applications that are installed in the NFC enabled mobile device. The one or more authentication certificates may be aggregated and compiled for easier browsing in the NFC enabled mobile device.

2. Storing data associated with the one or more authentication certificates in a secure element of the mobile device. For example, data associated with a flight ticket can be a booking number, passenger name, passport number, flight number, etc. This data can be stored in the secure element of the mobile device, which may be a subscriber identification module (SIM) card, an embedded chip, a Secure Digital (SD) card, etc.

3. Verifying the authenticity of the one or more authentication certificates using a NFC enabled transceiver that is connected to a server. The NFC enabled transceiver is connected to an external server and facilitates the transfer of data associated with the one or more authentication certificates from the NFC enabled mobile device to the external server for authentication. The external server to which the data is sent is associated with the one or more authentication certificates with which the data is associated with. Methods for transmitting and receiving data via NFC will be apparent to persons having skill in the relevant art, and may include communicating pursuant to the International Organization for Standardization (IOS) and International Electrotechnical Commission (IEC) joint standard 1OS/IEC 14443. In the context of checking-in and boarding of a flight, the external server may be part of a reservation system that is maintained by the airline.

4. Upon successful authentication, the external server can generate transaction data. The transaction data can be sent to the NFC enabled mobile device via the NFC enabled transceiver. In the context of checking-in and boarding of a flight, the transaction data can be a boarding pass and/or coupons for the passenger to utilize when shopping at the airport after checking-in.

Figure 1:
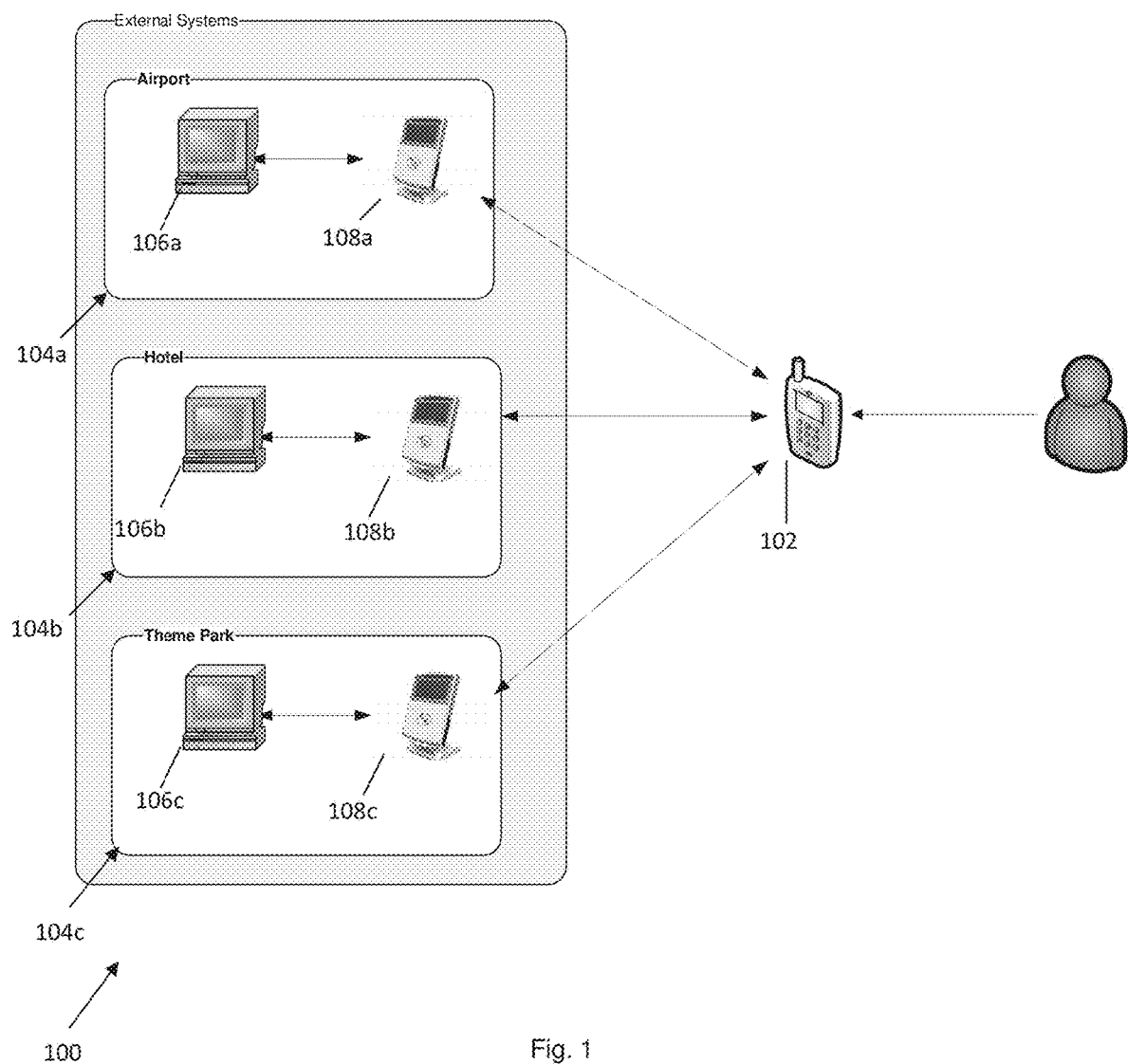

FIG. 1 is an architecture diagram of a system for conducting an authentication transaction, designated generally as reference numeral 100, according to an embodiment of the present invention.

The system 100 comprises a near field communication (NFC) enabled smartphone 102, and external systems 104a/104b/104c. The NFC enabled smartphone 102 comprises a secure element (e.g. subscriber identification module (SIM) card). The NFC enabled smartphone 102 can store one or more authentication certificates in a non-secure element of the smartphone or in the secure element of the smartphone. Data associated with one or more authentication certificates is preferably stored in the secure element of the smartphone.

The external systems may each comprise a reservation system 106a/106b/106c and a corresponding NFC contactless transceiver 108a/108b/108c. The NFC enabled smartphone 102 is able to communicate with the NFC contactless transceivers 108a/108b/108c via a suitable application protocol data unit (APDU). Each reservation system 106a/106b/106c may comprise one or more servers with suitable programs installed thereon for the processing of bookings, reservations, and checking-ins.

Each of the NFC contactless transceivers 108a/108b/108c is able to communicate with its respective reservation system 106a/106b/106c. Although three external systems 104a/104b/104c are shown in this embodiment, the system 100 can include a different number of such external systems. These external systems may be, but are not limited to, airport reservation systems, hotel reservation systems, car rental reservation systems and place of interest (museum, theme park, zoo, etc) reservation systems. The reservation systems can be configured to handle tasks which require authentication before access is provided, i.e. may not be limited to the processing of bookings, reservations, and checking-ins only. Also, even though only one NFC enabled smartphone 102 is shown in this embodiment, the system 100 can accommodate more than one NFC enabled smartphone 102. Further, it will be appreciated by a person skilled in the art that more than one NFC contactless transceiver can connected to each of the reservation systems 106a/106b/106c.

In an embodiment of the present invention, there is provided a system for conducting an authentication transaction, comprising:
  (i) at least one near field communication (NFC) enabled mobile device configured to store data associated with one or more authentication certificates in a secure element of the at least one NFC enabled mobile device;
  (ii) at least one server configured for verifying the authenticity of the one or more authentication certificates; and
  (iii) at least one NFC enabled transceiver configured for sending the data associated with the one or more authentication certificates from the at least one NFC enabled mobile device to the at least one server, and sending transaction data from the at least one server to the at least one NFC enabled mobile device upon successful authentication.

The authenticity of the one or more authentication certificates may be verified based on the data associated with the one or more authentication certificates. Furthermore, the at least one server may be further configured to generate the transaction data.

Figure 2:
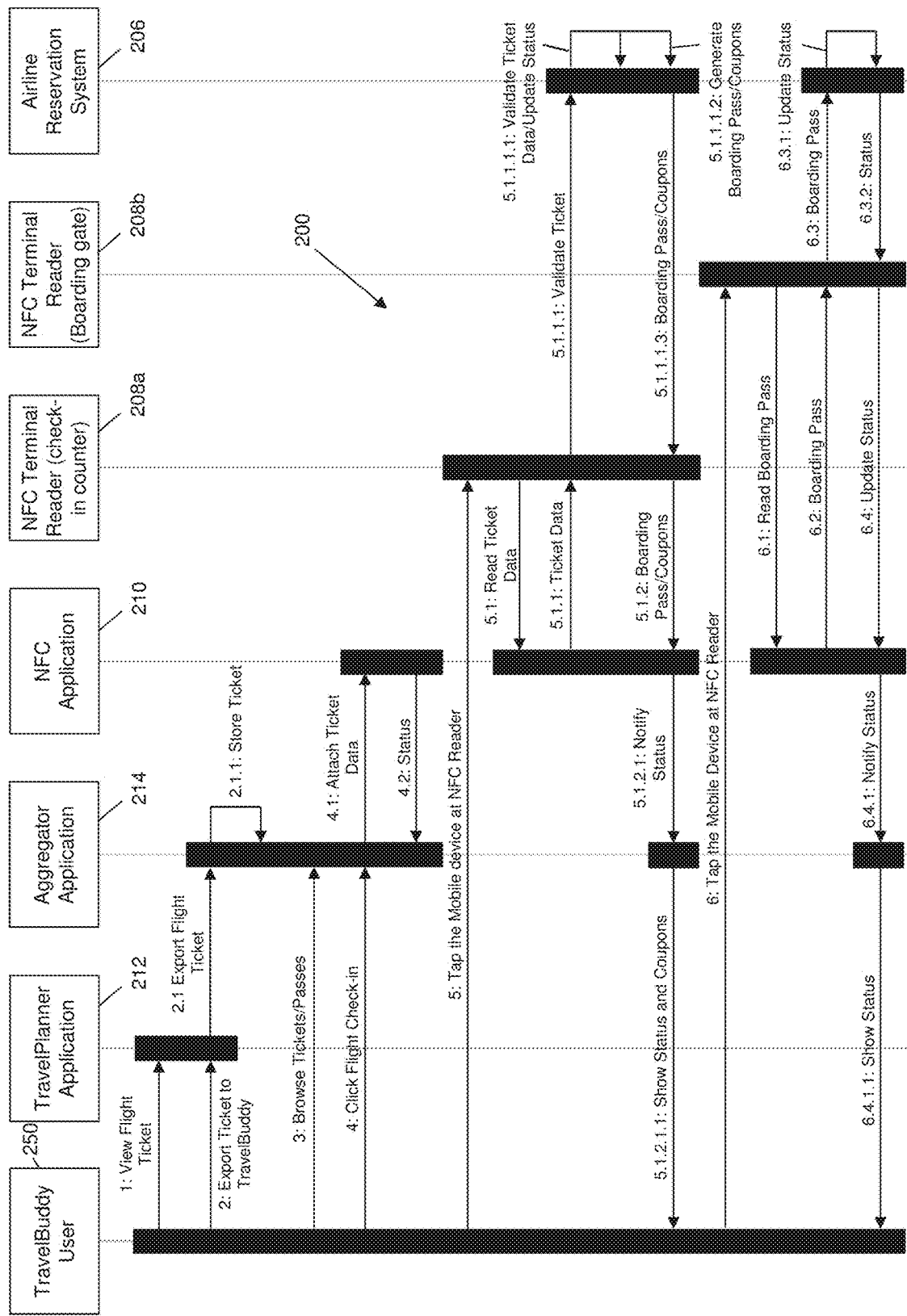

FIG. 2 is a sequence diagram of a method for conducting an authentication transaction, designated generally as reference numeral 200, according to an embodiment of the present invention. The method may be implemented using the system 100 described above. In this embodiment, the authentication transaction relates to the checking-in and boarding of a flight at an airport.

At step 1, a user 250 views his flight ticket using a travel planner application 212 that is installed in his NFC enabled smartphone. The travel planner application 212 may be administered by a third party. For example, the travel planner application 212 may be administered by the airline. At step 2, the user 250 chooses to export one of his flight tickets into an aggregator application 214 that is installed in his NFC enabled smartphone. At step 2.1, the aggregator application 214 exposes its application programming interface (API) to enable the selected flight ticket to be imported into the aggregator application 214. At step 2.1.1, the aggregator application 214 then stores the flight ticket in a non-secure element of the smartphone or in a secure element of the smartphone memory.

The aggregator application 214 is capable of importing and storing one or more flight tickets. In other embodiments, the aggregator application 214 is capable of importing and storing other types of authentication certificates, such as hotel vouchers, car rental vouchers, amusement park tickets, etc.

At step 3, the user 250 may browse the one or more stored authentication certificates (in this embodiment, the flight ticket) using the aggregator application 214. At step 4, when the user 250 is ready to check-in, the user can initiate the check-in process by e.g. selecting a "check-in" icon displayed in a graphical user interface of the aggregator application 214. Once check-in is initiated, at step 4.1, data associated with the one or more authentication certificates is attached to a NFC application 210. In an example embodiment, pertinent data associated with the one or more authentication certificates is first extracted from the one or more authentication certificates. Thereafter, the extracted data is transferred from the aggregator application (which may be stored in the non-secure element of the smartphone) to the NFC application.

An example of a NFC application is the MasterCard™ Value Added Service (MCVAS), developed by MasterCard™. In this example embodiment, the data associated with the one or more authentication certificates is the flight ticket data (e.g. booking number, passenger name, flight number, etc). The NFC application 210 is installed in a secure element in the NFC enabled smartphone (e.g. subscriber identity module (SIM) card) and can be configured to securely store the data associated with the one or more authentication certificates.

At step 4.2, once the flight ticket data is attached to the NFC application 210, a status message (e.g. "Tap to check-in") may be displayed in the graphical user interface of the aggregator application 214 to inform the user 250 that e.g. he can proceed to the airline check-in counter at the airport to initiate check-in.

At step 5, when the user 250 is ready to check-in, he can bring his NFC enabled smartphone into close proximity to a NFC contactless transceiver 208a (i.e. "tap" his NFC enabled smartphone on the NFC contactless transceiver 208a) at the airline check-in counter in the airport to initiate check-in.

At steps 5.1 and 5.1.1, the NFC contactless transceiver 208a reads the flight ticket data from the NFC application 210. The NFC contactless transceiver 208a is connected to an external airline reservation system 206. At step 5.1.1.1, the flight ticket data is sent to the external airline reservation system 206. The external airline reservation system 206 may be managed by the airline and comprises one or more servers with suitable programs installed thereon for the processing of bookings, reservations, and checking-ins. The one or more servers may include a coupon database. The coupon database may include a plurality of coupons that may be presented to the user 250 for "clipping" (e.g., receiving and saving in the mobile device, etc.) for future presentation in a financial transaction.

At step 5.1.1.1.1, the flight ticket is validated/authenticated by the airline reservation system 206. The authenticity of the flight ticket is verified based on the flight ticket data. For example, the booking number and passenger name can be cross-checked with the records stored on a database in the airline reservation system 206.

Upon successful validation/authentication, the status of the check-in is updated. For example, the airline reservation system 206 can flag the passenger as having checked-in on its database. At step 5.1.1.1.2, upon successful validation/authentication, the airline reservation system 206 also generates transaction data such as an electronic boarding pass. The electronic boarding pass comprises boarding pass data (e.g. boarding pass number, passenger name, flight number, etc). The airline reservation system 206 may also generate transaction data such as one or more coupons for use at a later stage. The coupon(s) can offer discounts or may be vouchers for use at selected retailers. For example, the coupon may be a discount for the purchase of perfume at the duty free shop in the departure terminal. Merchants are able to run more effective marketing campaigns and target customers more easily. For instance, coupons providing a discount for the purchase of perfume at the duty free shop in the departure hall are only sent to passengers.

Such coupons need to be sent to non-passengers who have no access to the departure hall (and hence no access to the duty free shop).

At steps 5.1.1.1.3 and 5.1.2, the generated electronic boarding pass and coupon(s) are sent from the airline reservation system 206 to the NFC application 210 via the NFC contactless transceiver 208a at the airline check-in counter.

At step 5.1.2.1, upon receipt of the electronic boarding pass and coupon(s) by the NFC application 210, the NFC application 210 sends a signal to the aggregator application 214. At step 5.1.2.1.1, upon receipt of the signal, the aggregator application 214 indicates the status of the check-in (e.g. "Check-in successful") and displays any coupon(s) on the graphical user interface of the aggregator application 214.

Alternatively or in addition to the automatic provision of coupon(s) by the airline reservation system 206, the user 250 can import coupons into the aggregator application 214 by scanning a QR code or a NFC tag.

The aggregator application 214 may be configured to display the received coupon(s). The graphical user interface of the aggregator application 214 may allow the user 250 to select any one of the coupons (if there is more than one coupon), and/or find out more details about the coupon (e.g. terms and conditions, etc).

At step 6, when the user 250 is ready to board the aeroplane, he can bring his NFC enabled smartphone into close proximity to a NFC contactless transceiver 208b (i.e. "tap" his NFC enabled smartphone on the NFC contactless transceiver 208b) located at the boarding gate. At steps 6.1 and 6.2, the NFC contactless transceiver 208b reads the boarding pass data from the NFC application 210. The NFC contactless transceiver 208b is connected to the external airline reservation system 206.

At step 6.3, the boarding pass data is sent to the external airline reservation system 206. At step 6.3.1, the boarding pass may be validated at the airline reservation system 206. The authenticity of the boarding pass is verified based on the boarding pass data. For example, the boarding pass number and passenger name can be cross-checked with the records stored on a database in the airline reservation system 206. Upon successful validation/authentication, the status of the boarding is updated. For example, the airline reservation system 206 can flag the passenger as having boarded the aeroplane.

At step 6.3.2 and 6.4, the boarding status is sent from the airline reservation system 206 to the NFC application 210 via the NFC contactless transceiver 208b.

At step 6.4.1, upon receipt of the boarding status at the NFC application 210, the NFC application 210 sends a signal to the aggregator application 214. At step 6.4.1.1, upon receipt of the signal, the aggregator application 214 indicates the boarding status (e.g. "Boarding successful").

The above described embodiment relates to the checking-in and boarding of a flight at an airport. However, embodiments of the present invention may potentially be implemented to handle any task which requires authentication before access is provided, and can be used in places such as hotels, car rental companies, places of interest, etc.

For example, embodiments of the present invention can be used for checking-in and out of a hotel. In an example embodiment, a user can export his hotel voucher from a third party travel planner application into an aggregator application. It is assumed that the user has previously booked the hotel and has received the hotel voucher for his stay. The aggregator application exposes its application programming interface (API) to enable the hotel voucher to be imported into the aggregator application.

The hotel voucher can be saved in the aggregator application, along with other authentication certificates such as flight tickets, etc. The user may browse the hotel voucher (and flight tickets) using the aggregator application that is installed in the NFC enabled smartphone. When the user is about to check-in to the hotel, he can initiate the check-in process by e.g. selecting a "check-in" icon displayed in a graphical user interface of the aggregator application.

Once check-in is initiated, data associated with the hotel voucher (e.g. booking number, guest name, check-in date, check-out date, etc) is attached to a NFC application. The NFC application is installed in a secure element in the NFC enabled smartphone (e.g. subscriber identity module (SIM) card) and can be configured to securely store the hotel voucher data.

Once the hotel voucher data is attached to the NFC application, a status message (e.g. "Tap to check-in") may be displayed in the graphical user interface of the aggregator application to inform the user that e.g. he can proceed to the hotel reception to initiate check-in.

Once the user reaches the hotel, he can "tap" his NFC enabled smartphone on a NFC contactless transceiver at the hotel reception to initiate check-in. The NFC contactless transceiver reads the hotel voucher data from the NFC application and sends the data to a hotel reservation system. The authenticity of the hotel voucher is verified based on the hotel voucher data. For example, the booking number and guest name can be cross-checked with the records stored on a database in the hotel reservation system. Upon successful validation/authentication, the status of the check-in is updated. For example, the hotel reservation system can flag the guest as having checked-in and assign him a room. The reservation system may generate transaction data such as a room number and may also provide voucher(s)/coupon(s). The generated transaction data is sent from the hotel reservation system to the NFC application via the NFC contactless transceiver. Upon receipt of the transaction data by the NFC application, the NFC application sends a signal to the aggregator application. Upon receipt of the signal, the aggregator application indicates the status of the check-in (e.g. "Check-in successful—Room Number 123") and displays any voucher(s)/coupon(s).

The aggregator application stores and aggregates all the vouchers and coupons. For example, the vouchers can be used to redeem for breakfast at the hotel or for shopping at retail outlets in the hotel. The vouchers can be used by selecting the appropriate voucher in the graphical user interface of the aggregator application.

On the day of checking-out, the hotel voucher data may be attached to the NFC application, and a status message (e.g. "Tap to check-out") may be displayed in the graphical user interface of the aggregator application to inform the user that e.g. he can proceed to the hotel reception to initiate check-out.

To initiate check-out, the user can "tap" his NFC enabled smartphone on a NFC contactless transceiver at the hotel reception. The NFC contactless transceiver reads the hotel voucher data from the NFC application and sends the data to the hotel reservation system. The authenticity of the hotel voucher is again verified based on the hotel voucher data. Upon successful validation/authentication, the status of the check-out is updated. For example, the hotel reservation system can flag the guest as having checked-out. The reservation system may generate transaction data such as an invoice and may also provide more coupon(s)/voucher(s).

Figure 3:
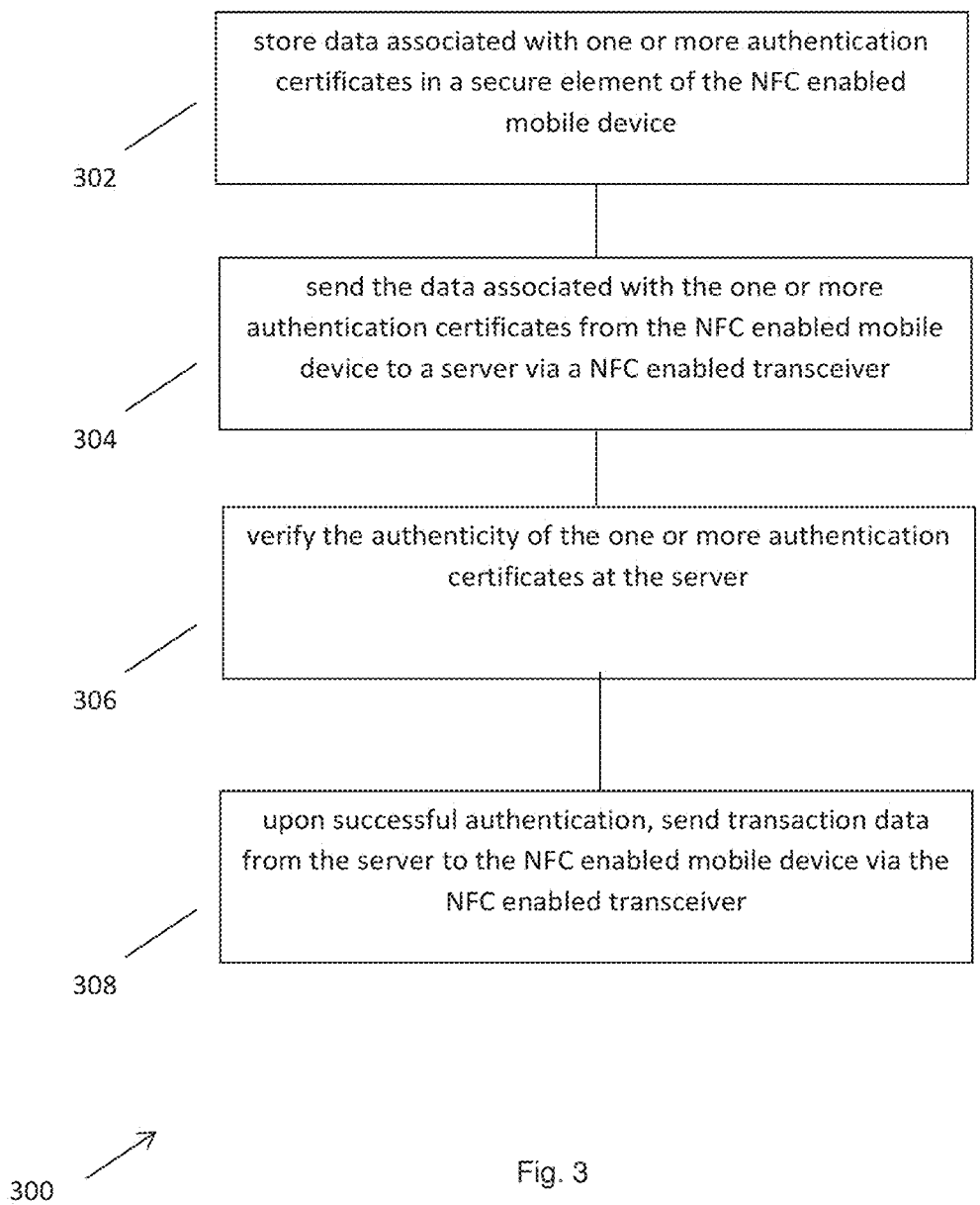

FIG. 3 is a flow chart, designated generally as reference numeral 300, illustrating a method of conducting an authentication transaction using a near field communication (NFC) enabled mobile device, according to an example embodiment of the present invention. At step 302, data associated with one or more authentication certificates is stored in a secure element of the NFC enabled mobile device. At step 304, the data associated with the one or more authentication certificates is sent from the NFC enabled mobile device to a server via a NFC enabled transceiver. At step 306, the authenticity of the one or more authentication certificates is verified at the server. At step 308, upon successful authentication, transaction data is sent from the server to the NFC enabled mobile device via the NFC enabled transceiver.

In another embodiment of the present invention, there is provided a near field communication (NFC) enabled mobile device for conducting an authentication transaction, comprising:
(i) at least one processor; and
(ii) at least one memory module having computer program code stored thereon, the computer program code configured to, with the at least one processor, cause the NFC enabled mobile device to:
store data associated with one or more authentication certificates in a secure element of the NFC enabled mobile device;
send, via NFC, the data associated with the one or more authentication certificates to a server;
query the server, to verify the authenticity of the one or more authentication certificates; and
receive upon successful authentication, transaction data from the server.

In addition, the computer program code can be further configured to, with the at least one processor, cause the NFC enabled mobile device to:
import one or more authentication certificates from one or more external sources into the NFC enabled mobile device; and/or
store the one or more authentication certificates in a non-secure element of the NFC enabled mobile device; and/or
store the transaction data in the secure element of the NFC enabled mobile; and/or
provide an indication once transaction data has been received; and/or
extract data associated with the one or more authentication certificates from the one or more authentication certificates; and/or
transfer the extracted data associated with the one or more authentication certificates from the non-secure element to the secure element of the NFC enabled mobile device.

The near field communication (NFC) enabled mobile device comprises a processor module, an input module such as a keypad and an output module such as a display. The processor module may include a processor, Random Access Memory (RAM) and Read Only Memory (ROM). The processor module may also include a number of Input/Output (I/O) interfaces, for example a first I/O interface to the display, and a second I/O interface to the keypad. The near field communication (NFC) enabled mobile device comprises a secure element for storing the NFC application, and a non-secure element for storing the aggregator application and the travel planner application.

Embodiments of the present invention advantageously allow the aggregation/compilation of a user's travel bookings (e.g. flight tickets, hotel vouchers, booking receipts, travel itineraries, etc) for easy browsing and access. Also, the user can use his NFC enabled mobile device to check-in at the airport and board flights, check-in and out of hotels, and/or gain entry into places of interest. In this way, users need not print out their flight tickets, hotel vouchers, booking receipts, travel itineraries, etc. This minimizes the hassle of printing out all these documents and safe-keeping them, and mitigates the risk of misplacing one or more of these documents.

The method(s) and/or system(s) of the example embodiments can be implemented on a computer system 400, schematically shown in FIG. 4. It may be implemented as software, such as a computer program being executed within the computer system 400, and instructing the computer system 400 to conduct the method of the example embodiment.

The computer system 400 comprises a computer module 402, input modules such as a keyboard 404 and mouse 406 and a plurality of output devices such as a display 408, and printer 410.

The computer module 402 is connected to a computer network 412 via a suitable transceiver device 414, to enable access to e.g. the Internet or other network systems such as Local Area Network (LAN) or Wide Area Network (WAN).

The computer module 402 in the example includes a processor 418, a Random Access Memory (RAM) 420 and a Read Only Memory (ROM) 422. The computer module 402 also includes a number of Input/Output (I/O) interfaces, for example I/O interface 424 to the display 408, and I/O interface 426 to the keyboard 404.

The components of the computer module 402 typically communicate via an interconnected bus 428 and in a manner known to the person skilled in the relevant art.

The application program is typically supplied to the user of the computer system 400 encoded on a data storage medium such as a CD-ROM or flash memory carrier and read utilising a corresponding data storage medium drive of a data storage device 430. The application program is read and controlled in its execution by the processor 418. Intermediate storage of program data maybe accomplished using RAM 420.

It will be appreciated by a person skilled in the art that numerous variations and/or modifications may be made to the present invention as shown in the embodiments without departing from a spirit or scope of the invention as broadly described. The embodiments are, therefore, to be considered in all respects to be illustrative and not restrictive.

The invention claimed is:

1. A method of conducting an authentication transaction using a near field communication (NFC) enabled mobile device, the method comprising:
   storing, by a processor of the NFC enabled mobile device, an NFC application in a secure element of the NFC enabled mobile device and an aggregator application in a non-secure element of the NFC-enabled mobile device;
   executing, by the processor of the NFC enabled mobile device, one or more third party applications;
   importing, by the processor, one or more authentication certificates from the one or more third party applications of the NFC enabled mobile device into the aggregator application;
   receiving, in the aggregator application, a request to authenticate the one or more authentication certificates;
   extracting, by the processor, data from the one or more authentication certificates in the aggregator application in response to the request;
   storing, by the processor, the extracted data associated with the one or more authentication certificates in the secure element of the NFC enabled mobile device;
   sending, from the NFC application, the stored extracted data associated with the one or more authentication certificates from the NFC enabled mobile device to a server via an NFC enabled transceiver of the mobile device;
   receiving, in the NFC application from the server via the NFC enabled transceiver, first transaction data of a user document;
   sending at least a portion of the first transaction data from the NFC application to the server;
   receiving, in the NFC application, second transaction data including authentication data from the server;
   sending a data signal from the NFC application to the aggregator application, the data signal including at least a portion of the second transaction data; and
   generating, in the aggregator application, an output associated with the authentication data and based on the data signal received from the NFC application.

2. The method of claim 1, further comprising importing, by the processor, the one or more authentication certificates from one or more external sources into the NFC enabled mobile device.

3. The method of claim 1, further comprising verifying, by the processor, an authenticity of the one or more authentication certificates based on the data associated with the one or more authentication certificates.

4. The method of claim 1, further comprising storing, by the processor, the transaction data in the secure element of the NFC enabled mobile device.

5. The method of claim 1, further comprising, by the processor, indicating on the NFC enabled mobile device once transaction data has been received.

6. The method of claim 1, further comprising updating, by the processor, a database on the server upon successful authentication.

7. The method of claim 1, wherein the authentication certificates are of different types and comprise one or more of: flight tickets, hotel vouchers, car rental vouchers, amusement park booking tickets; and wherein the server to which the data is sent is associated with the one or more authentication certificates with which the data is associated with.

8. The method of claim 1, wherein the transaction data comprises boarding passes or coupons.

9. A system for conducting an authentication transaction, comprising:
   at least one near field communication (NFC) enabled mobile device having a mobile device processor, a secure element, a non-secure element, and a mobile device memory storing executable instructions that when executed by the mobile device processor causes the mobile device processor to perform the steps of:
      executing an aggregator application and at least one third party application in the non-secure element of the at least one NFC enabled mobile device, the aggregating application having program code for importing one or more authentication certificates from the at least one third party application;
      receiving, in the aggregator application, a request to authenticate the one or more authentication certificates;
      extracting data from the one or more authentication certificates in response to the request;
      storing the extracted data from the one or more authentication certificates in the secure element;
      sending, to at least one server via NFC from the NFC application in the secure element, the stored data associated with the one or more authentication certificates;
      receiving, in the NFC application, first transaction data from the at least one server, including data of a user document;
      sending at least a portion of the first transaction data from the NFC application to the at least one server;
      receiving, in the NFC application, second transaction data from the at least one server, the second transaction data including the one or more authentication certificates;
      sending a data signal from the NFC application to the aggregator application, the data signal including at least a portion of the second transaction data; and
      generating, via the aggregator application, an output associated with the one or more authentication certificates and based on the data signal received from the NFC application;
   the at least one server comprising a server processor and server memory storing executable instructions which causes the server processor to perform steps of:
      verifying an authenticity of the one or more authentication certificates;
      generating a first transaction data based on a verification result of the authenticity of the one or more authentication certificates;

sending the server processor generated first transaction data to the mobile device processor;

generating a second transaction data based on a verification result of at least a portion of the first transaction data; and sending the server processor generated second transaction data to the mobile device processor.

10. The system of claim 9, wherein the authenticity of the one or more authentication certificates is verified based on the data associated with the one or more authentication certificates.

11. A near field communication (NFC) enabled mobile device for conducting an authentication transaction, comprising:

a secure element storing an NFC application;

a non-secure element storing an aggregator application;

at least one processor; and memory storing executable instructions that when executed by the at least one processor causes the at least one processor to perform the steps of:

executing an application programming interface of the aggregating application and at least one third party application;

importing one or more authentication certificates from the at least one third party application into the aggregating application;

receiving a request to authenticate the one or more authentication certificates;

extracting data from the one or more authentication certificates in response to the request;

storing the extracted data associated with the one or more authentication certificates in the secure element;

executing the NFC application stored in the secure element;

sending, to a server via NFC from the NFC application, the stored data associated with the one or more authentication certificates;

receiving, in the NFC application, first transaction data including data of a user document, sending at least a portion of the first transaction data from the NFC application to the server; and receiving, in the NFC application, second transaction data from the server, the second transaction data including authentication data;

sending a data signal from the NFC application to the aggregator application, the data signal including at least a portion of the second transaction data; and generating, in the aggregating application, a response to the request, wherein the response is associated with the authentication data and based on the data signal.

\* \* \* \* \*